United States Patent [19]

Stritzke

[11] Patent Number: 4,891,116

[45] Date of Patent: Jan. 2, 1990

[54] METHOD AND APPARATUS FOR ELECTROCHEMICALLY DECOMPOSING INORGANIC MATERIALS CONTAINED IN AN AQUEOUS RADIOACTIVE WASTE SOLUTION

[75] Inventor: Detlef Stritzke, Bruchsal, Fed. Rep. of Germany

[73] Assignee: Deutsche Gesellschaft für Wiederaufarbeitung von Kernbrennstoffen GmbH, Hannover, Fed. Rep. of Germany

[21] Appl. No.: 349,423

[22] Filed: May 8, 1989

Related U.S. Application Data

[62] Division of Ser. No. 264,615, Oct. 31, 1988, Pat. No. 4,849,074.

[30] Foreign Application Priority Data

Nov. 14, 1987 [DE] Fed. Rep. of Germany ....... 3738769
Feb. 24, 1988 [DE] Fed. Rep. of Germany ....... 3805741

[51] Int. Cl.$^4$ .............................................. C02F 1/46
[52] U.S. Cl. .................................... 204/241; 204/274
[58] Field of Search ...................... 204/239, 241, 274

[56] References Cited

FOREIGN PATENT DOCUMENTS 2449588 4/1976 Fed. Rep. of Germany .
3417839 11/1985 Fed. Rep. of Germany .

Primary Examiner—T. M. Tufariello
Attorney, Agent, or Firm—Walter Ottesen

[57] ABSTRACT

The invention is directed to a method for electrochemically decomposing inorganic material contained in an aqueous radioactive waste solution. The solution is concentrated by evaporation in order to reduce its volume for further treatment as a waste solution. In order to achieve a more effective decomposition of inorganic compounds in the aqueous radioactive solution, an electrolytic process is performed during evaporation of the waste solution with the electrolytic process effecting the electrochemical decompostion. An apparatus for carrying out the method includes an evaporator for accommodating the waste solution and the evaporator is configured as an electrolytic cell.

6 Claims, 1 Drawing Sheet

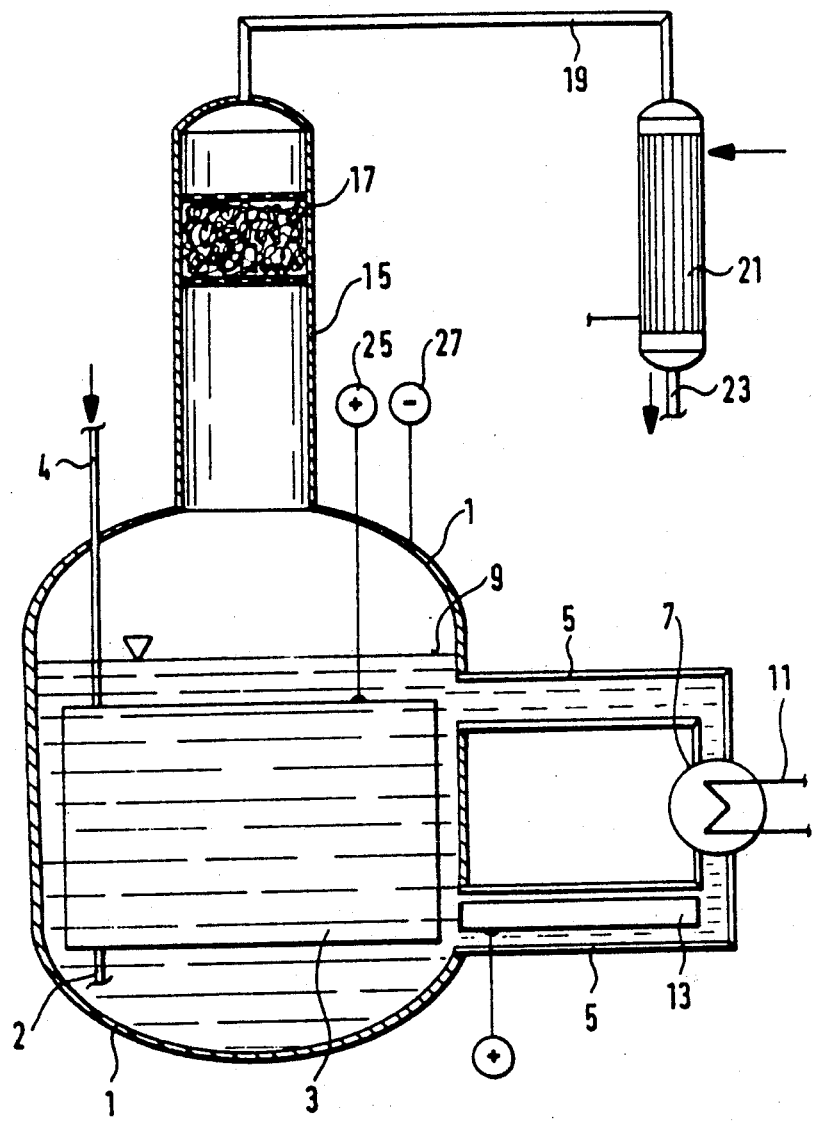

METHOD AND APPARATUS FOR ELECTROCHEMICALLY DECOMPOSING INORGANIC MATERIALS CONTAINED IN AN AQUEOUS RADIOACTIVE WASTE SOLUTION

This is a division of application Ser. No. 264,615, filed Oct. 31, 1988, now Pat. No. 4,849,074.

FIELD OF THE INVENTION

The invention relates to a method for electrochemically decomposing inorganic materials contained in an aqueous radioactive solution which, for further treatment as a waste solution, is concentrated by evaporation to reduce its volume.

BACKGROUND OF THE INVENTION

Radioactive liquids such as decontamination liquids or other aqueous radioactive waste solutions are often subjected to electrochemical decomposition as described in German Patent No. 2,449,588. The subsequent evaporation of the liquids which is intended to produce a substantial reduction in the quantities of waste which finally have to be stored can then be carried out with the minimum of difficulty. In this connection, reference can be made to European patent publication No. 01 62 356 A1.

Electrochemical decomposition of organic and inorganic materials contained in radioactive aqueous solutions has proved its value with respect to many such solutions.

SUMMARY OF THE INVENTION

It is the object of the invention to provide a method of the kind described above by means of which a more effective decomposition of inorganic compounds of aqueous radioactive solutions is achieved. It is a further object of the invention to provide such a method which is less complex.

The method of the invention is for electrochemically decomposing compounds of inorganic materials contained in an aqueous radioactive waste solution. The method includes the steps of: passing the radioactive solution into a tank-like evaporator configured as an electrolytic cell to provide a liquid volume of the solution in the evaporator; and, electrochemically decomposing the compounds in the cell while simultaneously vaporizing the liquid volume to provide a distillate and a concentrate for further treatment.

Thus, according to a feature of the method of the invention, an electrolytic operation is conducted to effect the electrochemical decomposition while the waste solution is evaporated.

Electrochemical treatment of the liquid phase in the evaporator can result in an effective decomposition of disturbing compounds in the particular radioactive solution in question. For example, inorganic compounds of low vapor pressure can be electrochemically decomposed to produce inert gas and $H_2O$. Simultaneous electrochemical treatment and evaporation of the radioactive solution simplifies carrying out the process.

The invention also relates to an apparatus for carrying out the method described above. According to a feature of the apparatus of the invention, an evaporator which receives the waste solution is configured as an electrolytic cell. The integrated configuration of an evaporator as an electrolytic apparatus facilitates the process cycle and reduces the cost of the equipment.

In an advantageous further embodiment of the invention, the evaporator housing is connected as a cathode and anodes are provided in the evaporator which project into the volume of liquid.

In a further advantageous development of the invention, a feed pipe for the waste solution, which is to be evaporated, projects into the evaporator housing and is arranged so that its outlet end is just above the housing bottom. The fresh waste solution is supplied far beneath the surface of the liquid which is exposed to evaporation. The fresh solution can then rise at the anodes and so be subjected to an electrochemical decomposition. Thus, the waste solution has adequate time for electrochemical decomposition while electrochemically decomposed solution which has already risen can evaporate at the same time.

BRIEF DESCRIPTION OF THE DRAWING

The invention will now be described with reference to the single figure of the drawing which is a schematic of the apparatus according to the invention.

DESCRIPTION OF THE PREFERRED EMBODIMENTS OF THE INVENTION

The evaporator comprises a cylindrical evaporator housing 1 of high grade steel which is connected as a cathode. A concentric anode 3 is disposed in the liquid chamber of the evaporator 1. Preferably, the anode material consists of titanium and it may be constructed as an expanded or perforated plate.

Disposed in the upper region of the evaporator housing 1 is a feed pipe 4 for the solution which is to be evaporated. The pipe 4 projects into the solution and is disposed with its outlet end 2 just above the bottom. Laterally on the evaporator housing 1, a pipeline 5 extends in the lower region horizontally to a heat exchanger 7 and extends from there back into the evaporator so as to be below the surface 9 of the liquid in the evaporator. The heat exchanger 7 is heated by a heating medium which is supplied via coiled pipes 11. Natural circulation is provided within the pipeline 5 connected to the heat exchanger 7.

An ancillary electrode in the form of an anode core 13 is disposed inside of the lower portion of the pipeline 5.

The evaporator 1 extends upwardly into a connecting piece 15 which is provided with a demister 17 for trapping aerosols. The vapor is passed into a cooler 21 via a pipeline 19. The distillate is drawn off via a pipeline 23.

The apparatus described above functions in the manner explained below.

A radioactive solution containing inorganic materials is fed into the evaporator housing 1 via the feed pipe 4. An electrical voltage is applied across cathode 1 and anode 3 via connections 25 and 27. An electrical voltage is also applied across cathode 1 and core anode 5 which increases the electrochemical decomposition activity. The control of the electrolytic process is performed by maintaining the current or voltage constant. The radioactive solution is heated by the heat exchanger 7 to a temperature of about 100° C. The solution vaporizes once the inorganic materials contained therein have been electrochemically decomposed. The distillate is drawn off from the cooler 21 and passed to the further units in the process. A concentrated solution is left in the evaporator which is likewise discharged for further treatment.

The radioactive solution fed into the evaporator housing can be, for example, a nitric acid solution.

It is understood that the foregoing description is that of the preferred embodiments of the invention and that various changes and modifications may be made thereto without departing from the spirit and scope of the invention as defined in the appended claims.

What is claimed is:

1. An apparatus for electrochemically decomposing compounds of inorganic materials contained in an aqueous radioactive waste solution, the apparatus comprising:
    an evaporator for receiving and vaporizing said aqueous radioactive waste solution to form a distillate and concentrate for further treatment; and,
    said evaporator including electrolytic means for electrochemically decomposing said compounds while said waste solution is in said evaporator.

2. The apparatus of claim 1, said evaporator comprising a housing defining a tank for holding a volume of said solution; and, said electrolytic means comprising a cathode connection applied to said housing and an anode projecting into said solution.

3. The apparatus of claim 2, comprising a feed pipe having an outlet for passing the radioactive waste solution into said tank; and, said feed pipe being mounted in said housing to place said outlet close to the bottom of said tank so as to permit the incoming solution to pass along said anode to effect the electrochemical decomposition of said compounds while rising to the surface of said volume.

4. An apparatus for electrochemically decomposing compounds of inorganic materials contained in an aqueous radioactive waste solution, the apparatus comprising:
    a tank for receiving a liquid volume of the aqueous radioactive waste solution;
    feed means for feeding additional quantities of said solution into said tank beneath the surface of said liquid volume;
    electrolytic means for electrochemically decomposing said compounds;
    said electrolytic means including means for connecting said tank as a first electrode of a first polarity and a second electrode of a second polarity opposite to said first polarity; said second electrode being disposed in said liquid volume above said feed means; and,
    heating means for heating said liquid volume so as to cause said solution to vaporize at said surface.

5. The apparatus of claim 4, said heating means including: a conduit having a first end penetrating said tank and communicating with said liquid volume at a first elevation above the bottom of said tank and having a second end penetrating said tank and communicating with said liquid volume at a second elevation above the bottom of said tank with said second elevation being less than said first elevation; and, heat exchanger means disposed in said conduit for heating the liquid in said conduit to thereby provide a natural heat induced circulation between said conduit and said tank thereby raising the temperature of said liquid volume to effect the vaporization thereof at said surface.

6. The apparatus of claim 5, said electrolytic means further comprising an ancillary electrode of said second polarity disposed in said conduit.

* * * * *